(12) United States Patent
Pearson et al.

(10) Patent No.: US 8,093,747 B2
(45) Date of Patent: Jan. 10, 2012

(54) AIRCRAFT ELECTRICAL POWER SYSTEM ARCHITECTURE USING AUXILIARY POWER UNIT DURING APPROACH AND TAXI

(75) Inventors: Wayne Pearson, Oro Valley, AZ (US); Jean-Luc Derouineau, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 28 days.

(21) Appl. No.: 12/630,755

(22) Filed: Dec. 3, 2009

(65) Prior Publication Data

US 2011/0133545 A1    Jun. 9, 2011

(51) Int. Cl.
*H02J 9/08*    (2006.01)
(52) U.S. Cl. ............................ 307/9.1; 307/85
(58) Field of Classification Search .................. 307/9.1, 307/85–87
See application file for complete search history.

(56) References Cited

U.S. PATENT DOCUMENTS

| | | | |
|---|---|---|---|
| 3,807,664 A | 4/1974 | Kelly, Jr. et al. | |
| 5,899,411 A * | 5/1999 | Latos et al. | 244/53 A |
| 6,786,209 B2 | 9/2004 | Stewart | |
| 7,406,370 B2 | 7/2008 | Kojori et al. | |
| 7,468,561 B2 * | 12/2008 | Kern et al. | 290/4 A |
| 7,514,810 B2 | 4/2009 | Kern et al. | |
| 2003/0126864 A1* | 7/2003 | Thompson | 60/788 |
| 2004/0189098 A1* | 9/2004 | Algrain et al. | 307/80 |
| 2006/0042846 A1* | 3/2006 | Kojori et al. | 180/65.8 |
| 2007/0101721 A1 | 5/2007 | Dooley et al. | |
| 2008/0143115 A1* | 6/2008 | Kern et al. | 290/52 |
| 2008/0179947 A1* | 7/2008 | Suttie | 307/9.1 |
| 2008/0238202 A1* | 10/2008 | Kern et al. | 307/53 |
| 2009/0072080 A1 | 3/2009 | Bhargava | |
| 2010/0133813 A1* | 6/2010 | Cote et al. | 307/9.1 |
| 2011/0133545 A1* | 6/2011 | Pearson et al. | 307/9.1 |

* cited by examiner

*Primary Examiner* — Fritz M Fleming
(74) *Attorney, Agent, or Firm* — Miriam Jackson, Esq.

(57) ABSTRACT

An electrical power system architecture uses an auxiliary power unit as an electrical power source during taxi (ground idle) and approach idle (if required). Using the APU as a power source enables a low pressure spool driven electrical generator to be off-line when its speed is too low for it to operate effectively.

10 Claims, 2 Drawing Sheets

AIRCRAFT ELECTRICAL POWER SYSTEM ARCHITECTURE USING AUXILIARY POWER UNIT DURING APPROACH AND TAXI

BACKGROUND OF THE INVENTION

The present invention relates to apparatus and methods for generating electricity in an aircraft by using the low pressure spool of an engine and, more particularly, to apparatus and methods for using the auxiliary power unit during approach and taxi, in conjunction with the low pressure spool, to provide electricity to the aircraft.

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power, pneumatic power (bleed air) or thrust for powering an aircraft in flight. Many new aircraft systems are designed to accommodate electrical loads that are greater than those on current aircraft systems. The electrical system specifications of commercial airliner designs currently being developed may demand over four times the electrical power of current commercial airliners. This increased electrical power demand must be derived from mechanical power extracted from the engines that power the aircraft. When operating an aircraft engine at relatively low power levels, e.g., while idly descending from altitude, extracting additional electrical power from the engine mechanical power may reduce the ability to operate the engine properly.

Traditionally, electrical power is extracted from the high-pressure (HP) engine spool in a gas turbine engine. Extracting excessive power from the HP spool reduces engine surge margins and therefore requires increased engine speed at idle conditions. The increased engine speed results in excessive residual thrust. Surge bleed can be used to improve engine surge margin but this results in wasted energy and fuel.

Extraction of electrical power from the low pressure (LP) engine spool, rather than just the HP spool, is effective in maintaining surge margins without surge bleed. However, LP spool electrical power extraction is difficult due to the wide speed range (over 1:4 from ground idle to 100%). This wide speed range may make large electrical generators, such as those needed for aircraft relying on more electric architecture (MEA), impractical.

As can be seen, there is a need for a method or system to extract electrical power from the engine that will allow electrical power to be generated during low engine operating power levels without reducing engine operability, but will satisfy the increasing electrical demands of the aircraft.

SUMMARY OF THE INVENTION

In one aspect of the present invention, an electrical power system architecture comprises a low pressure spool rotatably movable by an engine; a generator driven by the low pressure spool providing power to a power bus; and an auxiliary power unit providing power to the power bus when the low pressure spool driven generator is unable to provide sufficient power to the power bus.

In another aspect of the present invention, an electrical power system architecture for an aircraft comprises a low pressure spool rotatably movable by an engine; a generator driven by the low pressure spool providing power to a power bus; and an auxiliary power unit providing power to the power bus when the aircraft is in a predetermined flight status.

In a further aspect of the present invention, a method for generating electricity in an aircraft by using the low pressure spool of an engine comprises driving a generator with a low pressure spool of an engine to supply power to a power bus; monitoring a speed of the low pressure spool of the engine; and supplying power from an auxiliary power unit to the power bus when the low pressure spool rotational speed drops below a pre-determined minimum.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide an electrical power system architecture and method for using the low pressure (LP) spool of an engine for electricity generation in an aircraft. The LP spool of a large turbofan engine has a speed range of over 1:4 from ground idle to 100%. The speed range of the LP spool may be from about 1:2.5 from idle descent to 100%. This speed range (about 1:2.5) may be a more practical speed range for an LP spool driven electrical generator. In one embodiment of the present invention, the operating speed range of an LP spool driven generator may be limited for use in this more practical speed range, from idle descent to 100%.

An electric power source is still needed, however, when the LP spool drops outside this speed range, such as during approach and taxi. In one embodiment of the present invention, the electrical power system architecture may use an auxiliary power unit (APU) as an electrical power source during taxi (ground idle) and approach idle, if required. Using the APU as a power source may enable an LP spool driven electrical generator to be off-line when its speed is too low for it to operate effectively. While APU's may currently be used during these phases (such as ground idle and approach idle), conventional APU's have not been used in conjunction with LP spool driven generators and not to enable the use of practical LP spool driven generators, as is the case according to embodiments of the present invention.

Figure 1:
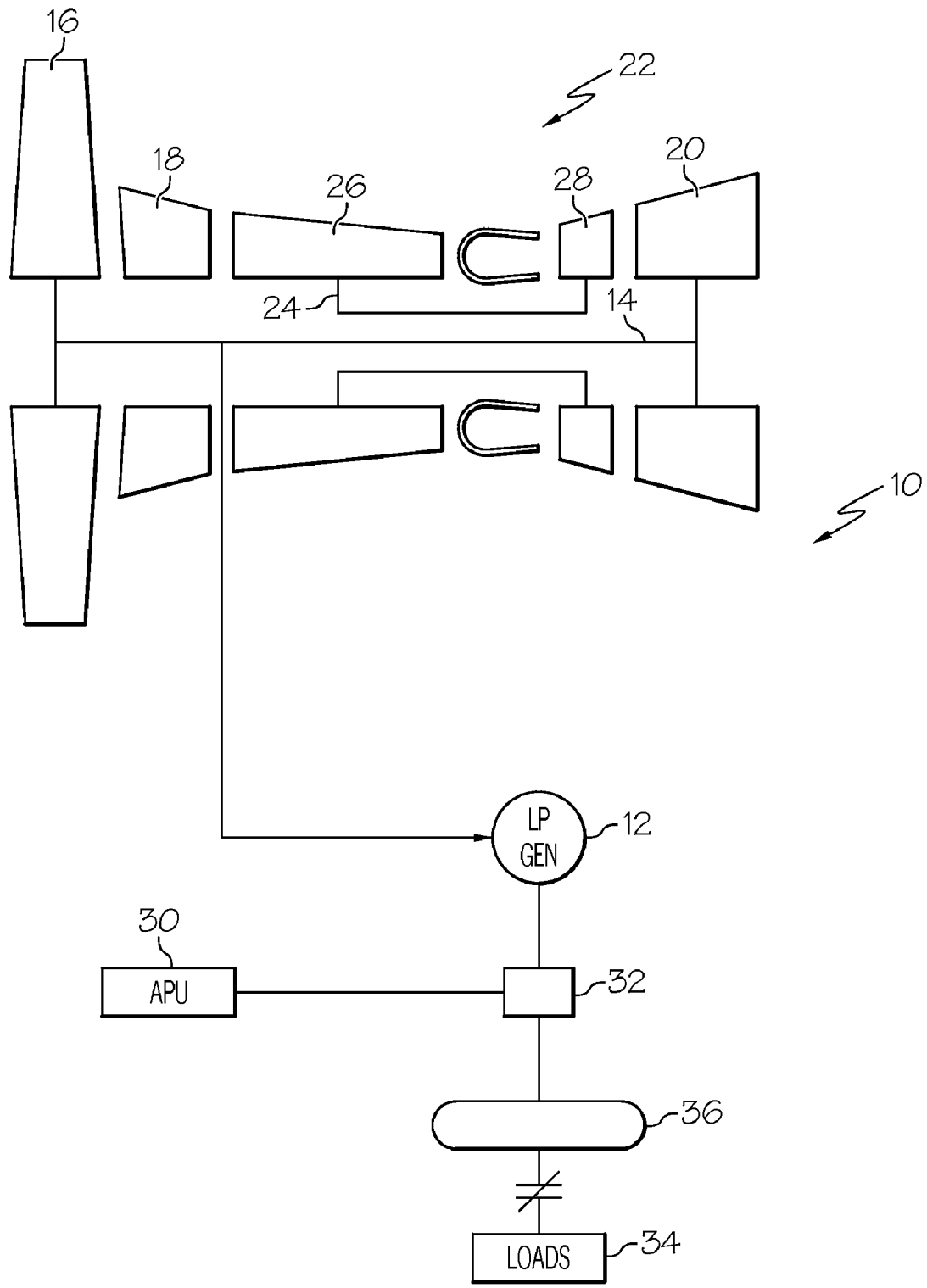
FIG. 1 is a schematic representation of an aircraft electrical power system architecture according to an embodiment of the present invention.

Referring to FIG. 1, there is shown an electrical power system architecture 10 with an externally located LP generator 12, according to one embodiment of the present invention. A low pressure (LP) spool 14 of an engine 22 may include, rotatably attached thereto, a fan 16, a low pressure compressor 18 and a low pressure turbine 20. A high pressure spool 24 may include, rotatably attached thereto, a high pressure compressor 26 and a high pressure turbine 28. The LP generator 12 may be mechanically connected to be driven by the LP spool 14 such that rotation of the LP spool 14 drives an input shaft (not shown) of the LP generator 12.

An APU 30 may be electrically connected to the electrical power system architecture 10 directly or via power electronics 32. The LP generator 12 may also be electrically connected directly or to the power electronics 32 to supply power to loads 34 via a power bus 36. The LP generator 12 may be any conventional power generator. For example, LP generator 12 may be a permanent magnet (PM) generator.

When the LP generator 12 is unable to provide sufficient power to the power bus 36, the APU 30 may provide sufficient power thereto. For example, when the LP spool 14 drops in rotational speed below a predetermined level (for example, less than 60% of the 100% power rotational speed, typically less than about 45% of the 100% power rotational speed, even more typically, less than about 40% of the 100% power rotational speed), such as during taxi and often times, during approach idle, the APU 30 may provide power to the power bus 36. Alternatively, the APU 30 may supplement the power provided by LP generator 12 through the use of the power electronics 32.

Figure 2:
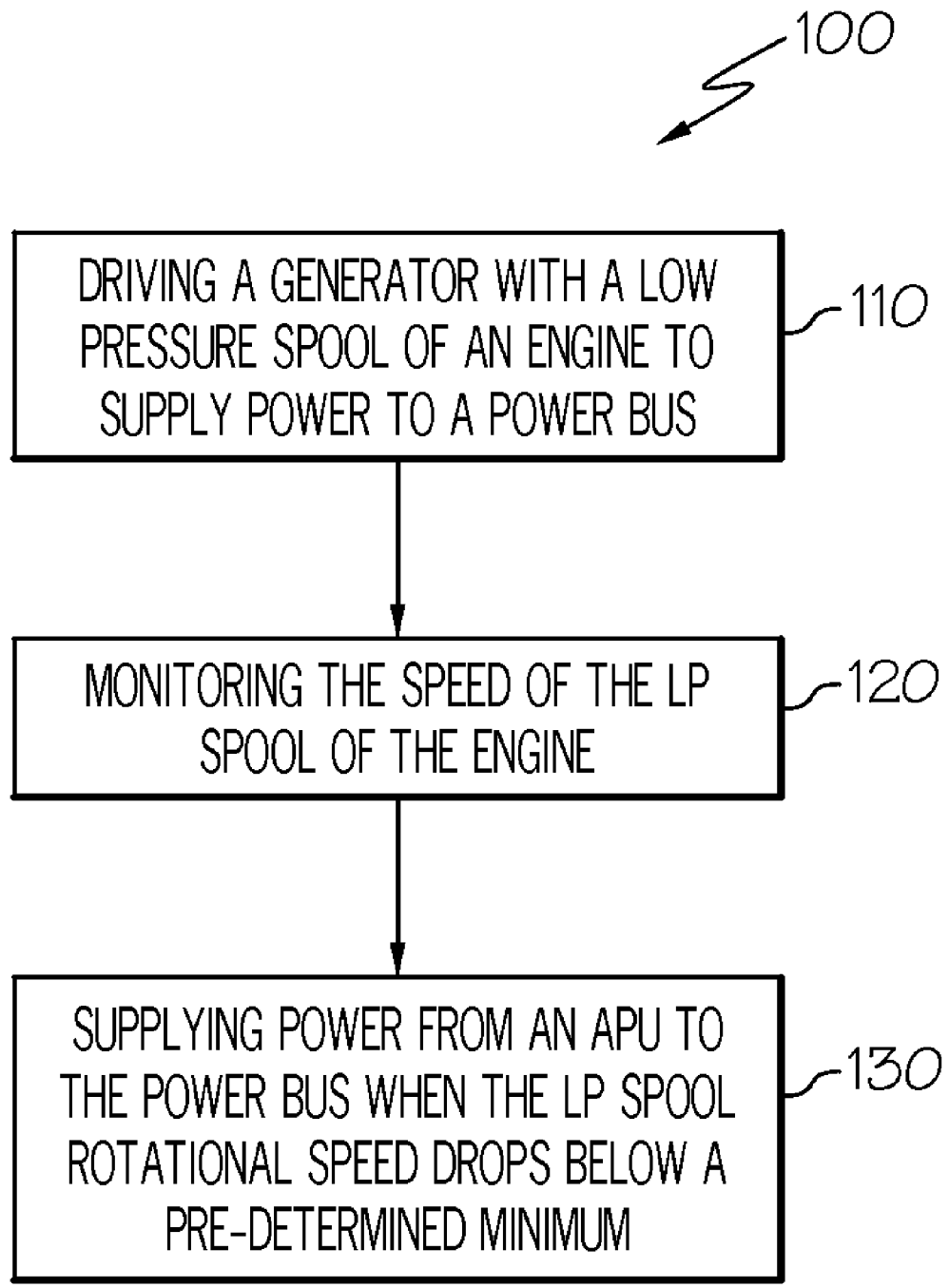
FIG. 2 is a flow chart describing a method for using the low pressure spool of an engine for electricity generation in an aircraft, according to another embodiment of the present invention.

Referring now to FIG. 2, there is shown a flow chart describing a method 100 for generating electricity in an aircraft by using the low pressure spool of an engine. The method 100 may include a step 110 of driving a generator (i.e., LP generator 12) with a low pressure spool (i.e., LP spool 14) of an engine to supply power to a power bus. The method 100 may further include a step 120 of monitoring the speed of the LP spool of the engine and a step 130 of supplying power from an APU to the power bus when the LP spool rotational speed drops below a pre-determined minimum. In one embodiment of the present invention, the speed of the LP spool of the engine may be monitored indirectly, such as by determining the state of flight of the aircraft. For example, during taxi and approach idle, the APU may be automatically engaged to supply power to the power bus.

While the above description describes the use of an APU with an LP spool driven generator to supply power to an aircraft, additional components may be present as is known in the art. For example, an aircraft taking advantage of various aspects of the present invention may also include high pressure spool driven generators, additional busses, various power electronics and control means as is known in the art.

It should be understood, of course, that the foregoing relates to exemplary embodiments of the invention and that modifications may be made without departing from the spirit and scope of the invention as set forth in the following claims.

We claim:

1. An electrical power system architecture comprising:
a low pressure spool rotatably movable by an engine;
a generator driven by the low pressure spool providing power to a power bus; and
an auxiliary power unit providing power to the power bus when the low pressure spool driven generator is unable to provide sufficient power to the power bus,
wherein the generator is off-line when low pressure spool speed is below a predetermined minimum, and when the auxiliary power unit provides power to the power bus, and
wherein the auxiliary power unit provides power to the power bus when the low pressure spool rotates at a speed less than about 40% of the 100% power rotational speed of the low pressure spool.

2. The electrical power system architecture of claim 1, including power electronics configured to receive power from at least one of the generator and the auxiliary power unit and to deliver power to the power bus.

3. The electrical power system architecture of claim 1, wherein the electrical power system architecture is in an aircraft.

4. The electrical power system architecture of claim 3, wherein the auxiliary power unit provides power to the power bus during taxi of the aircraft.

5. The electrical power system architecture of claim 4, wherein the auxiliary power unit provides power to the power bus during approach idle of the aircraft.

6. The electrical power system architecture of claim 1, wherein the auxiliary power unit and the generator both provide power to the power bus when the generator alone is unable to provide sufficient power to the power bus.

7. An electrical power system architecture for an aircraft comprising:
a low pressure spool rotatably movable by an engine;
a generator driven by the low pressure spool providing power to a power bus; and
an auxiliary power unit providing power to the power bus when the aircraft is in a predetermined flight status,
wherein the generator is off-line when low pressure spool speed is below a predetermined minimum, and when the auxiliary power unit provides power to the power bus.

8. The electrical power system architecture of claim 7, wherein the predetermined flight status is selected from the group consisting of taxi and approach idle.

9. A method for generating electricity in an aircraft by using a low pressure spool of an engine, the method comprising:
driving a generator with the low pressure spool of the engine to supply power to a power bus;
monitoring a speed of the low pressure spool of the engine;
supplying power from an auxiliary power unit to the power bus when the low pressure spool rotational speed drops below a pre-determined minimum;
providing power to the power bus from the auxiliary power unit during taxi of the aircraft; and
taking the generator off-line when the auxiliary power unit provides power to the power bus,
wherein the speed of the low pressure spool of the engine is monitored indirectly by a determination of the flight status of the aircraft.

10. The method of claim 9, further comprising providing power to the power bus from the auxiliary power unit during approach idle of the aircraft.

\* \* \* \* \*